United States Patent
Hecht et al.

(10) Patent No.: US 8,062,177 B2
(45) Date of Patent: *Nov. 22, 2011

(54) METHOD FOR SELECTING A NEUTRAL POSITION OF A MOTOR VEHICLE TRANSMISSION AND FOR SELECTING A PARKING GEAR OF A MOTOR VEHICLE

(75) Inventors: Walter Hecht, Ravensburg (DE); Armin Gierling, Langenargen (DE); Klaus Steinhauser, Kressbronn (DE); Frank Worms, Langenargen (DE); Bernd Zänglein, Ravensburg (DE); Stéphane Klein, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 566 days.

This patent is subject to a terminal disclaimer.

(21) Appl. No.: 12/257,533

(22) Filed: Oct. 24, 2008

(65) Prior Publication Data
US 2009/0111647 A1    Apr. 30, 2009

(30) Foreign Application Priority Data
Oct. 24, 2007 (DD) .................. 10 2007 000 560

(51) Int. Cl.
*B60W 10/00* (2006.01)
*F16H 61/16* (2006.01)
*G06F 7/00* (2006.01)

(52) U.S. Cl. .................. 477/96; 477/125; 701/62

(58) Field of Classification Search ............ 477/97, 477/115, 125, 96; 701/62, 65; 180/271, 180/282, 285
See application file for complete search history.

(56) References Cited

U.S. PATENT DOCUMENTS

| 3,937,105 A | 2/1976 | Arai et al. |
| 4,892,014 A | 1/1990 | Morell et al. |
| 5,919,112 A | 7/1999 | Michael et al. |
| 2009/0111649 A1* | 4/2009 | Hecht et al. .................. 477/92 |

FOREIGN PATENT DOCUMENTS

| DE | 41 27 991 A1 | 2/1993 |
| EP | 0 814 287 A2 | 12/1997 |

* cited by examiner

*Primary Examiner* — Roger Pang
(74) *Attorney, Agent, or Firm* — David & Bujold, P.L.L.C.

(57) ABSTRACT

A method of selecting a neutral position of an automatic or automated transmission and a parking gear to immobilize a motor vehicle. The neutral position and parking device can be set or activated, depending on a gear selected by the driver with a selector device and depending on other vehicle operating parameters. Only when the motor vehicle is at least substantially stationary, an ignition circuit acting on the drive motor vehicle is electrically interrupted and a "Neutral" (N) gear is selected by a selector device occur simultaneously, can an N-holding phase, in which the transmission is in a friction-free neutral position, be activated by a separate control device provided in addition to the selector device, as long as an energy management system of the motor vehicle allows activation of the N-holding phase.

24 Claims, 2 Drawing Sheets

METHOD FOR SELECTING A NEUTRAL POSITION OF A MOTOR VEHICLE TRANSMISSION AND FOR SELECTING A PARKING GEAR OF A MOTOR VEHICLE

This application claims priority from German Application Serial No. 10 2007 000 560.3 filed Oct. 24, 2007.

FIELD OF THE INVENTION

The invention relates to a method for selecting a neutral position of an automatic or automated motor vehicle transmission and for selecting a parking device provided for immobilizing a motor vehicle, wherein the neutral position and parking device can be set or actuated depending on the gear selected by the driver on a selector device and depending on other operating parameters of the motor vehicle. In addition, the invention pertains to a motor vehicle controlled by this method.

BACKGROUND OF THE INVENTION

Known automatic or automated motor vehicle transmissions include a parking lock with which the driven shaft of a transmission can be mechanically locked. In addition to a purely mechanical system to actuate such a parking lock by way of a mechanical functional connection between a selector lever that can be operated by the driver in the interior of the motor vehicle and the parking lock in the transmission, electromechanical and electrohydraulic systems for actuating such a parking lock are known for example from DE 41 27 991 C2. The parking lock in the transmission is connected, via an electrical functional connection, to a selector device in the interior of the motor vehicle operated by the driver. The parking lock can be electromechanically or electrohydraulically actuated by way of a parking lock function implemented in an electronic control device of the transmission depending on a gear chosen on the selector device and depending on other operating parameters of the motor vehicle.

In addition, numerous methods are known for automatically setting such a parking lock. In U.S. Pat. No. 3,937,105, it is thus proposed to automatically set the parking position of the transmission independently from the gear selected by the driver, when the current in an ignition circuit of the motor vehicle is interrupted and the vehicle simultaneously continues to roll at a speed less than a defined low threshold value.

A method is known from U.S. Pat. No. 4,892,014 in which the parking lock of the transmission is automatically set by an electric motor, if an ignition circuit of the motor vehicle is interrupted and the vehicle speed simultaneously is less than a defined low threshold value, but also if the driver's door of the motor vehicle is open and the driver seat simultaneously has no weight on it and simultaneously the vehicle speed is less than the above-mentioned low threshold value. In both cases, it is envisioned that, upon automatically setting the parking lock, a vehicle parking brake is also automatically actuated. In U.S. Pat. No. 4,892,014, it is also proposed that, if the ignition circuit is closed without the drive motor of the motor vehicle running, the transmission is automatically shifted to the neutral position by an electric motor without the driver having to take any action.

Finally, a function for automatically setting a parking lock of an automatic transmission is known from EP 0 814 287 B1 in which the parking lock in the automatic transmission is automatically set by the transmission control device, if the vehicle speed of the motor vehicle is zero and an ignition circuit is simultaneously interrupted and, as a simultaneous additional condition, a predetermined time span since the interruption of the of the ignition circuit has expired, or a vehicle door is opened, but at the latest, however this being a sole condition if the ignition key is removed from the ignition lock. In order to obtain greater vehicle reliability, as a peculiarity in all three cases setting the parking lock is prevented if the driver selects neutral with the selector device directly before shutting off the motor or within a predetermined time span after shutting off the motor.

The present invention has the task of creating an alternative method to the state of the art for the automatic selection of the neutral position in an automatic or automated transmission of a motor vehicle and for the automatic selection of a parking device of the motor vehicle provided to immobilize the motor vehicle with sufficient safeguarding of the motor vehicle against a starting or rolling unintended by the driver and with as slight as possible impairment of the vehicle's drivability or ability to move with avoidance of any change of the operating condition of the transmission or motor vehicle that might surprise the driver.

SUMMARY OF THE INVENTION

An Auto-P function with complex function logic is proposed in the method of the invention, which is based on a method in which a neutral position of an automatic or automated transmission of a motor vehicle and a parking device of the motor vehicle provided to immobilize the motor vehicle can be automatically set depending on a gear selected with a selector device by the driver of the vehicle and depending on other operating parameters of the motor vehicle. The above-mentioned parking device of the motor vehicle can either be a parking lock on the transmission or a parking brake on the vehicle.

Essential to the invention is the functional linkage of individual aspects and individual criteria. The known Boolean logic operators are used in the following for the purpose of a clear and misinterpretation-proof illustration of these functional linkages and for better legibility capital letters are used in the writing.

According to the invention, the method exhibits the following procedural steps:

IF the motor vehicle approaches at least approximately a standstill AND an ignition circuit acting on the drive motor of the motor vehicle is electrically interrupted at the same time AND the "Park"(P) gear is simultaneously selected on the selector device, THEN the parking device is actuated and remains so to immobilize the vehicle;

IF the motor vehicle approaches at least approximately a standstill AND an ignition circuit of the drive motor is electrically interrupted at the same time AND the "Drive" (D) gear or "Reverse" (R) gear is simultaneously selected, THEN the parking device is automatically actuated to immobilize the motor vehicle;

IF the motor vehicle approaches at least approximately a standstill AND an ignition circuit acting on the drive motor is electrically interrupted at the same time AND the "Neutral" (N) gear is simultaneously selected on the selector device AND an N-holding phase, which can be activated by a separate operational control provided in addition to the selector device, is simultaneously activated, as long as the energy management system of the motor vehicle allows activation of the N-holding phase, THEN the transmission is automatically shifted to a neutral position free of any frictional connection and is temporarily held in the neutral position free of any frictional connection;

IF the motor vehicle approaches at least approximately a standstill AND an ignition circuit acting on the drive motor is electrically interrupted at the same time AND the "Neutral" (N) gear is simultaneously selected on the selector device AND the N-holding phase is simultaneously not activated, THEN the transmission is automatically held in the neutral position free of any frictional connection until it is detected that the driver wants to leave or is leaving the vehicle, whereby then, when it is detected that the driver wants to leave or is leaving the vehicle, the parking device is automatically actuated to immobilize the motor vehicle.

It is also proposed that an N-holding phase, in which the transmission is in the neutral position free of any frictional connection, can be activated by way of a separate control device provided in addition to the selector device. This N-holding position, however, can generally not be activated if another gear other than "Neutral" (N) is set by way of the selector device. In addition, the N-holding phase can generally only be activated if the motor vehicle simultaneously approaches at least approximately a standstill, an ignition circuit acting on the drive motor of the motor vehicle is electrically interrupted at the same time, and sufficient energy supply is simultaneously available to temporarily hold the transmission in a neutral position free of a frictional connection.

The method of the invention can be used advantageously if the driver of the motor vehicle is stopped before a car wash device and the drive motor has stopped because of an interruption of the ignition circuit acting on the drive motor, and the transmission of the motor vehicle would automatically set the parking lock without any additional measures because of system-inherent reasons such as an absence of oil pressure in the transmission as the result of a now stopped oil pump.

By way of the method of the invention, it is possible for the driver, using simple control means, to consciously and quickly bring the motor vehicle into an operational state in which despite a stopped drive motor the motor vehicle is able to roll, in so far as the "Neutral" (N) gear was previously selected. If a different gear than "Neutral" (N) was set by way of the selector device then, for safety reasons, the motor vehicle is generally brought to a state with fixed output.

As a result a very high vehicle availability is obtained with a simultaneously large degree of safety for vehicle occupants and the environment with respect to an unintentional rolling of the motor vehicle by way of this linkage of the four above-mentioned individual functions of the inventive method using logic AND.

The first of these four individual functions of the method of the invention ("IF the motor vehicle approaches at least approximately a standstill AND an ignition circuit acting on the drive motor of the motor vehicle is electrically interrupted at the same time AND the "Park" (P) gear is simultaneously selected on the selector device, THEN the parking lock of the transmission is set and remains so"), considers those operating states in which the driver shortly before or during the detection that the motor vehicle is stopped or almost stopped with an interrupted ignition circuit, himself selected the park position on the motor vehicle's selector device. The first of the four individual functions of the inventive method also considers those operating conditions in which the driver selects the park position on the motor vehicle's selector device during the activated N-holding phase and thereby intentionally ends the previously activated N-holding phase. This definite desire of the driver, that the vehicle be immobilized by the actuation of the parking device is implemented in the transmission in the context of the first individual function mentioned above.

The second of the four individual functions of the method of the invention ("IF the motor vehicle approaches at least approximately a standstill AND an ignition circuit of the drive motor is electrically interrupted at the same time AND the "Drive" (D) gear or "Reverse" (R) gear is simultaneously selected, THEN the parking device is automatically actuated to immobilize the motor vehicle") considers the operational states in which, before or during the detection that the motor vehicle is stopped or almost stopped with an interrupted ignition circuit, the selector device is in a position which would result in a frictional connection in the transmission with a running drive motor or a sufficient supply of pressure medium to the transmission. In this case, the vehicle is automatically immobilized for safety reasons by actuation of the parking device, in order to prevent a rolling away of the motor vehicle in any case.

The third of the four individual functions of the method of the invention ("IF the motor vehicle approaches at least approximately a standstill AND an ignition circuit of the drive motor is electrically interrupted at the same time AND the "Neutral" (N) gear is simultaneously selected on the selector device AND an N-holding phase, which can be activated by way of a separate control device provided in addition to the selector device, is simultaneously activated, as long as an energy management system of the motor vehicle or of the transmission allows the activation of the N-holding phase, THEN the transmission is automatically shifted to a neutral position free of any frictional connection and is temporarily held in the neutral position free of any frictional connection") defines the possibility that the transmission can consciously be brought to a condition that is free of any frictional connection under certain conditions. Those entry conditions are listed that must absolutely be met in order to activate the N-holding phase. The state of the transmission with an activated N-holding phase is clearly described. It is defined, also in the context of the third individual function mentioned above, that the transmission cannot be brought to a friction-free connection state indefinitely by the inventive method, which will be explained in more detail later.

It is proposed in the context of this third individual function of the inventive method, as an important function to protect the electrical onboard power system of the vehicle and to safeguard the starting ability of the drive motor, that the N-holding phase is always only activated if the energy management system of the motor vehicle or the transmission has detected that the battery of the motor vehicle or another storage means for electric energy installed in the motor vehicle, can make a sufficiently large amount of energy available in order to hold the transmission for at least a predetermined time span in a neutral position free of a frictional connection. In this regard, reference is made to the customary manner of transmission construction using an electrohydraulically actuatable parking lock system, in which the parking lock is disengaged using hydraulic pressure, is held in the disengaged state by way of an electrically energized electromagnet and, in the absence of hydraulic pressure and an electromagnet without electricity, is engaged by way of spring power. This proposed functional development can ensure, particularly in conjunction with such a transmission, that the N-holding phase cannot be activated at all if the electrical onboard power system cannot, or not sufficiently, provide the required electrical energy. In this way, a short-term emergency abortion of the previously activated N-holding phase surprising the driver is avoided and the starting ability of the drive motor of the motor vehicle is safeguarded—especially in applications in which such an emergency abortion of the previously activated N-holding phase cannot functionally be implemented.

A practical, technically simple embodiment of such a function to protect the electrical onboard power system and to safeguard the starting ability of the motor, can, for example, consist of activating the N-holding phase being forbidden, if the current electrical voltage and/or the current electrical state of charge of the motor vehicle's energy storage, whose energy is provided to start the drive motor and/or supply the transmission control device, has dropped below a previously defined lower threshold value. Here, the concept "previously defined lower threshold value" shall be understood an absolute numerical value, for example an electrical voltage of 12.5 volts.

In a technically more complicated, but functionally more precise variation of such a function to protect the electrical onboard power system of the motor vehicle and to safeguard the starting ability of the drive motor, it is proposed to mathematically correlate the current state of charge of the energy accumulator or the state of charge of the energy accumulator at the start of the N-holding phase, or the current electrical voltage of the energy accumulator or the electrical voltage of the energy accumulator at the start of the N-holding phase with that, which is needed to maintain the transmission in a friction-free neutral position for a predefined time span. Accordingly, it can be provided in a variation of such a function that activation of the N-holding phase is forbidden if the calculated difference between the current electrical state of charge of the energy accumulator, whose electrical energy is provided to start the drive motor and/or supply the transmission control device, and that amount of electrical energy needed to hold the transmission in a friction-free neutral position for a predefined time span has dropped below a predefined lower threshold value. A value that makes sense for such a time period is a time of 20 or 30 minutes. Such an amount of energy can be determined relatively easily by computation in that the theoretical power consumption of the transmission control device determined for the component parts used is integrated over a predefined time span or, in that the mathematical product of the current operating voltage and the theoretical power consumption of the transmission control device, is integrated over the predefined time span. In a refinement of the function, the above-mentioned, predefined lower threshold value can also be predefined as a function of a temperature of the drive motor or a temperature of the vehicle surroundings, whereby the battery discharge behavior and the increased motor starting energy requirement must be particularly considered at low temperatures.

In addition to the above-mentioned entry conditions, which must absolutely be met in order to activate the N-holding phase in which the transmission is in a friction-free neutral position, other entry conditions can also predetermined, which also must be met in order to be able to activate the N-holding phase. It can be provided that, in addition to the already mentioned four entry conditions, "the motor vehicle approaches at least approximately a standstill", "an ignition circuit acting on the drive motor is electrically interrupted", "the "Neutral" (N) gear is selected", and "the energy management system of the motor vehicle allows the activation of the N-holding phase", which must be met simultaneously in order to even be able to activate the N-holding phase using the separate control device, an additional condition, "the motor vehicle is in an at least approximately horizontal position", must be met to be able to activate the N-holding phase.

It can also be provided that in addition to the four entry conditions, "the motor vehicle approaches at least approximately a standstill", "an ignition circuit acting on the drive motor is electrically interrupted", "the "Neutral" (N) gear is selected" and "the energy management system of the motor vehicle allows the activation of the N-holding phase", which must be met simultaneously in order to be able to even activate the N-holding phase, in which the transmission is in a friction-free neutral position, using a separate control device, another condition, "the ignition key has not been removed from a mechanical or electromechanical ignition switch associated with the ignition key, or is not located outside a defined zone around the electronic ignition switch of the motor vehicle associated with the ignition key", must be met in order to be able to activate the N-holding phase.

All entry conditions mentioned above can also be combined with each other in a meaningful way. Thus it can be provided that the N-holding phase can only be activated, IF the motor vehicle is in an at least approximately horizontal position AND the determined current speed of the motor vehicle is simultaneously less than a predefined, small threshold value (typically less than 5 km/hr (3.1 mi/hr)) AND simultaneously an ignition key has not been removed from a mechanical or electromechanical ignition switch associated with the ignition key, or is not located outside a defined zone around an electronic ignition switch of the motor vehicle associated with an ignition key AND at the same time, the "Neutral" (N) gear has been selected using the selector device AND simultaneously the energy management system has checked, with positive results, the presence of sufficient energy supply for temporarily maintaining the N-holding phase. In this case then, five individual functions are linked into a complex entry criterion with a functional logic using boolean AND operators.

It can also be provided that the N-holding phase can only be activated if it is detected that the driver is not leaving or does not want to leave the vehicle. With regard to the intent or action of the driver indicating a desire to leave or has already left the vehicle, a conclusion can be drawn, for example, if one or more of the following criteria are met "the driver's door of the motor vehicle is open",
"the driver seat belt lock is open",
"the driver seat occupancy indicator reports an unoccupied driver seat", wherein it is useful to functionally link at least two of these criteria with each other by way of the "logic AND".

If the parking device provided to immobilize the motor vehicle is configured as a parking lock of the usual design on the transmission, which—when set—cannot again be released without sufficient oil supply to the transmission with a stopped drive motor, an additional entry condition to permit N-holding phase activation can be provided, so that the N-holding phase can only be activated using the separate control device as long as the parking lock on the transmission has not yet been set.

As a result, a high degree of safety against an unacceptable activation of the N-holding phase is achieved by the logic linkage of these entry conditions and partial functions in the context of the third individual function of the inventive method using "logic AND".

Coming back to the last of the four individual functions of the inventive method, the fourth individual function of the inventive method ("IF the motor vehicle approaches at least approximately a standstill AND an ignition circuit of the drove motor is electrically interrupted at the same time AND the "Neutral" (N) gear is simultaneously selected on the selector device AND the N-holding phase is simultaneously not activated, THEN the transmission is automatically held in the neutral position free of any frictional connection, at least until it is detected that the driver wants to leave or is leaving the vehicle, wherein then, if it is detected that the driver wants to leave or is leaving the vehicle, the parking device is automatically actuated to immobilize the motor vehicle") considers those operating states in which the selector device is in the "Neutral" (N) gear before or during the detection that the motor vehicle is standing still or is at least almost stopped with an interrupted ignition circuit, but the N-holding phase is not activated. In this case, the transmission is then automatically brought to the neutral position pursuant to a command on the selector device. The motor vehicle is only immobilized by the activation of the transmission and/or vehicle parking device, if it is detected that the driver wants to leave or is leaving the vehicle or until one other exit condition is met. In this manner—with consideration given to the safety aspects—a certain mobility of the vehicle is allowed, even if the driver does not expressly desire it.

A conclusion can be drawn about the driver's intention or action that he wants to leave or is leaving the car, for example, if at least one or more of the following criteria are met:
"the driver's door of the motor vehicle is open",
"the driver seat belt lock is open",
"the driver seat occupancy indicator reports an unoccupied driver seat",
wherein it is useful to functionally link at least two of these criteria with each other by way of "logic AND".

Other possible exit conditions to automatically end the neutral position of the transmission set by the selector device are, for example:
that the command of the selector device has been shifted from "Neutral"(N) to "Park" (P),
and/or that the energy management system of the motor vehicle demands an automatic abortion to protect the electrical onboard power system of the motor vehicle and to maintain the starting ability of the drive motor,
and/or that the ignition key has been removed from the mechanical or electromechanical ignition switch or is located outside a defined zone around an electronic ignition switch.

Discussed in more detail in the following are possible functions of the inventive method in the context of the activated N-holding phase, divided into the categories, "important functions with activated N-holding phase" and "optional functions with activated N-holding phase". If needed, the person skilled in the art will combine the proposed functions in a useful manner.

One important function is that, if the N-holding phase is being activated or has been activated, an acoustic and/or optical indicator is simultaneously triggered and/or output. This warns the driver that he performed a manual intervention or that an intervention immobilizing the motor vehicle has been performed and the motor vehicle can roll as a result.

As an optical function to increase the safety against accidental removal of the ignition key, it may be provided that, if the holding phase is being activated or has been activated, an ignition switch lock—also known as a "key lock"—is being activated or has been activated, which prevents the mechanical ignition key from being withdrawn from the mechanical or electromechanical ignition switch or the electronic ignition key—for example, of the type of an "ID card"—from being removed too far from the electronic ignition switch.

With regard to the de-activation of the previously activated, specific N-holding phase, in which the transmission is located in the friction-free neutral position, two variations are proposed. In the first of these two variations, it is proposed that the previously activated N-holding phase can be de-activated manually by the driver—preferably by way of a separate control device, a function of the category "important functions". In this case it makes sense that, if the previously activated specific N-holding phase is manually ended, the motor vehicle is automatically immobilized by actuation of the parking device, independently from the "Neutral" (N) gear previously selected by the selector device. The driver also has the selector device available for manual de-activation of the previously activated N-holding phase, in that he can change the preset gear position from previously "Neutral" (N) to "Park" (P).

It is proposed in the second variation that the previously activated N-holding phase, in which the transmission is located in a friction-free neutral position, can be automatically de-activated. When such an automatic termination of the previously activated N-holding phase should or must occur, results in particular from aspects of operating safety and protection against system failure.

It is proposed as an important function to protect the onboard electrical power system of the motor vehicle and to safeguard the starting ability of the drive motor that the previously activated N-holding phase be able to be automatically de-activated by the energy management system of the motor vehicle or transmission. There has already been mention in the context of the entry conditions to be met to activate the N-holding phase of the problem of conventional transmission designs with an electrohydraulically actuated parking lock system in which the parking lock is held in the released position by way of an electrically energized electromagnet. The proposed functional expansion, in particular in conjunction with such a transmission, can prevent that the vehicle battery is excessively discharged by the amount of electrical energy used in the context of the inventive method.

The monitoring of the current electrical charge state or the current electrical voltage of the vehicle battery offers efficient protection of the vehicle battery against excessive discharge. It is accordingly proposed in one embodiment that the previously activated N-holding phase is automatically terminated if the current charge state and/or the current electrical voltage of an electrical energy accumulator of the motor vehicle, which is provided to start the drive motor and/or supply the transmission control device, has dropped to a value below a previously defined discharge threshold. The term "previously defined discharge threshold" shall mean an absolute numerical value, for example, an electrical voltage of 12 volts.

It is proposed in a technically more complex, but functionally more exact variation of such a function, to protect the electrical onboard power system of the motor vehicle and to safeguard the starting ability of the drive motor, to monitor the amount of energy actually removed—in particular from the transmission control device—as part of the inventive function of the vehicle battery or the electrical energy accumulator of the motor vehicle provided to supply the transmission control device and/or start the drive motor and to mathematically correlate it with the current charge state of the energy accumulator, or the charge state of the energy accumulator, at the start of the N-holding phase or the current electrical voltage of the energy accumulator or the electrical voltage of the energy accumulator at the start of the N-holding phase. Accordingly, a variation of such a function can provide that the previously activated N-holding phase is automatically terminated if the calculated difference between the current electrical state of charge of the energy accumulator, whose electrical energy is used to start the drive motor and/or to supply the transmission control device, and the quantity of electrical energy, which was taken from the electrical energy accumulator of the motor vehicle in order to maintain the neutral position of the transmission as part of the function of the invention, has exceeded a previously defined upper boundary value, whereby this upper boundary value is predefined as a function of the current electrical voltage of the energy accumulator or as a function of the electrical voltage of the energy accumulator at the start of the N-holding phase or as a function of the current electrical charge state of the energy accumulator or as a function of the electrical charge state of the energy accumulator at the start of the N-holding phase. Such a quantity of energy can be calculated, relatively simply, in that the current actual power consumption of the transmission control device is integrated over time since the start of the N-holding phase or in that the mathematical product of the current actual operating voltage and current actual power consumption of the transmission control device is integrated over time from the start of the N-holding phase. In a refinement of the function, the above-mentioned, predefined upper boundary value can also be predefined as a function of the drive motor temperature or the temperature of the vehicle surroundings, whereby the battery discharge behavior and the increased motor starting energy requirement at low temperatures must receive special consideration.

It can also be provided as an optional function to increase the safety against driver inattention, that the previously activated N-holding phase is automatically terminated if a predefined time period expires. Such an automatic termination of the N-holding phase in the form of a reproducible event is easily comprehensible for the driver and thus less surprising than other automatic terminations of the N-holding phase. This function has the additional advantage that the electrical onboard power system of the motor vehicle is not overly stressed by the inventive method, in so far as the charge state of the vehicle battery at the start of the N-holding phase is not already at a low level. The above-mentioned time period then advantageously starts, when the command to activate the N-holding phase is detected or, at the latest, when the transmission is actually in the neutral position.

It is proposed as an optional function to increase the safety, with changing operating parameters, that the previously activated N-holding phase is automatically ended if the current speed of the motor vehicle is greater than a predefined velocity threshold. It is thereby ensured that the motor vehicle is only able to roll within predetermined boundaries. The predefined velocity threshold can thereby also be greater than the predefined small threshold value of the vehicle speed, which may not be exceeded upon activation of the N-holding phase.

In order to increase safety, with changing operating parameters, there can also be the provision, as an optional function, that the previously activated N-holding phase is automatically terminated if the vehicle is not in an at least approximately horizontal position.

It is provided as an optional function to increase safety with respect to driver inattention and misuse that the previously activated N-holding phase is automatically ended if the ignition key is removed from the mechanical or electromechanical ignition switch or is located outside a defined zone around the electronic ignition switch.

For safety reasons it is proposed, in conjunction with all the previously mentioned functions for the automatic de-activation of the previously activated N-holding phase, that the vehicle is always automatically immobilized by actuation of the parking device independently from the "Neutral" (N) gear previously selected with the selector device, if the previously activated holding phase is automatically ended. It is thereby safely prevented that the transmission is later inadvertently placed into such a gear, which upon the start of the motor would result in a frictional connection in the transmission.

The monitoring to see whether the driver remains unchanged in the vehicle is a further function of the category "important functions with activated N-holding phase". It is thus proposed to increase the safety against driver inattention that a suitable warning is activated or triggered, if it detected that the driver wants to leave or is leaving the vehicle, without the N-holding phase being terminated. This warning—for example, acoustic and/or optical—should inform the driver that the N-holding phase is still active and the transmission is therefore free of friction and the motor vehicle can thus roll. If the driver ignores this warning and leaves the vehicle without previously placing the selector lever into "Park" (P) and/or without having previously shut off the N-holding phase using the separate control device, it can then be assumed that he consciously wants to keep the vehicle in a condition where it can roll, without himself having to be inside the vehicle interior. The other criteria for the automatic abortion of the N-holding phase are naturally not affected by this partial function and can still, as described, result in an automatic actuation of the parking device. As already previously mentioned, a conclusion can be drawn about the intent or action of the driver to want to leave or is leaving the vehicle, if one or more of the following criteria are met:

"the driver's door of the motor vehicle is open",
"the driver seat belt lock is open",
"the driver seat occupancy indicator reports an unoccupied driver seat".

In addition, if needed, the person skilled in the art will meaningfully combine the proposed variations for the automatic de-activation of the N-holding phase with each other and also, if needed, with variations for the manual de-activation of the N-holding phase.

BRIEF DESCRIPTION OF THE DRAWINGS

The invention will now be described, by way of example, with reference to the accompanying drawings in which.

DETAILED DESCRIPTION OF THE INVENTION

Figure 1A:
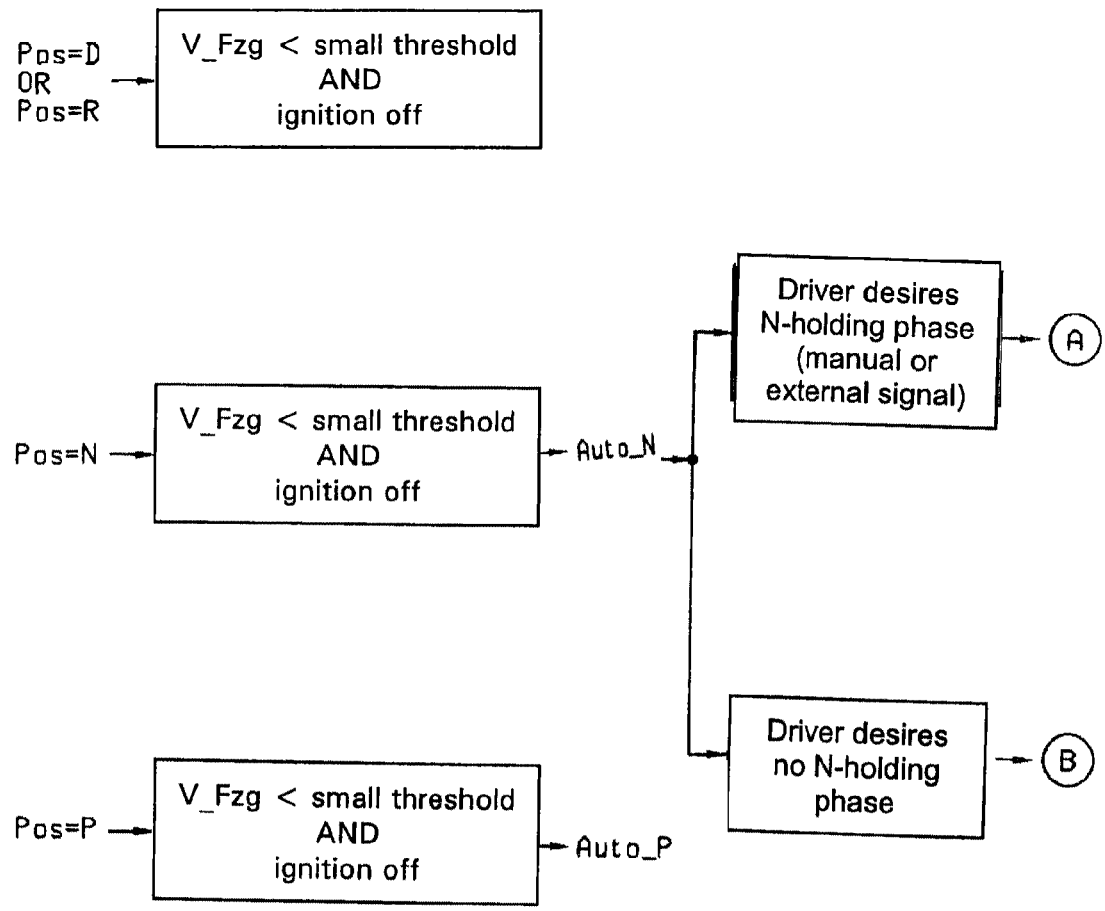
FIGS. 1A and 1B are functional flow diagrams for further explanation of the technical implementation of a method according to the invention previously described in detail.
Figure 1B:
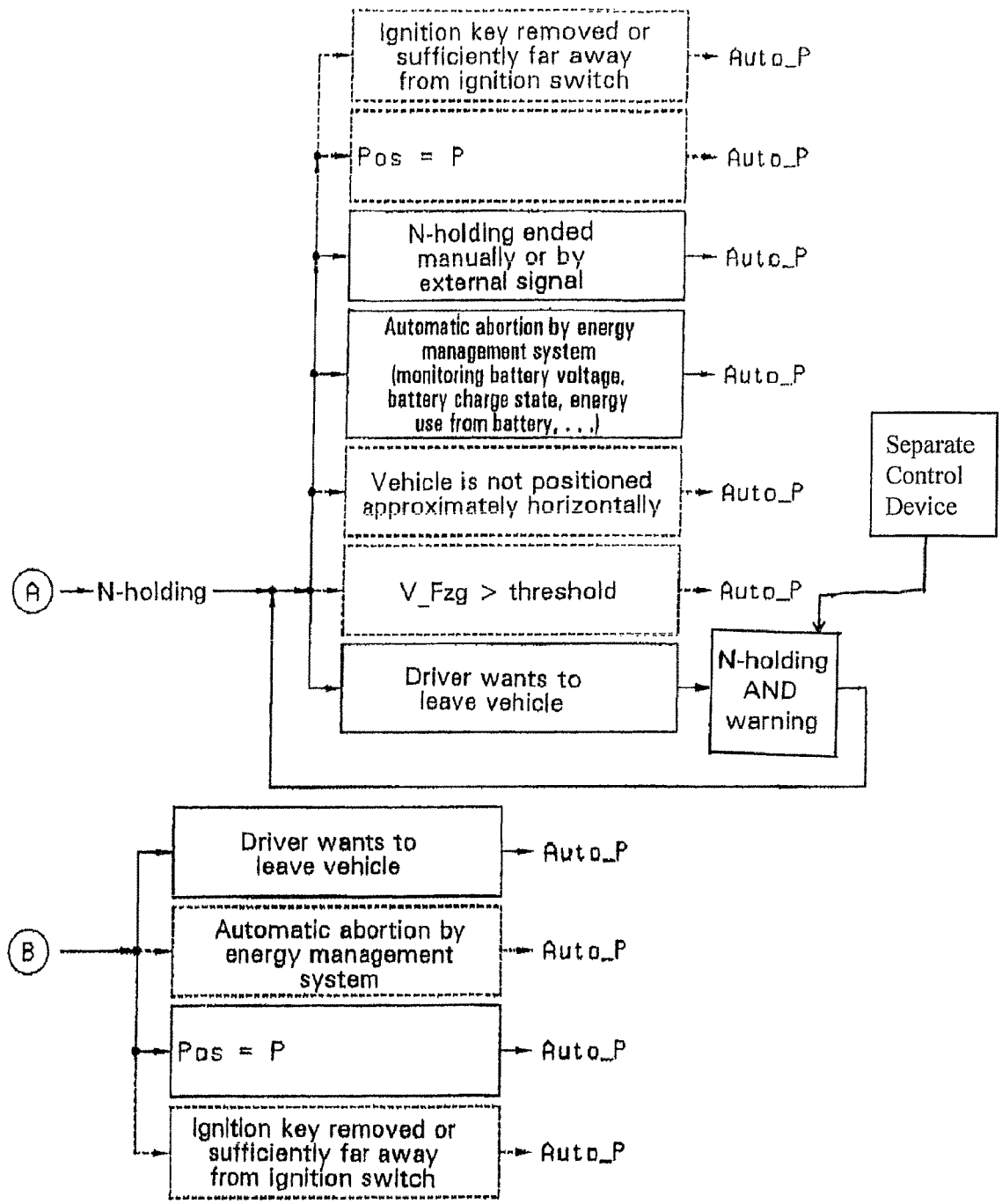

Those functional blocks, which are essential in the context of this technical implementation, are shown with solid lines, while functional blocks, which can be viewed as optional in the context of this technical conversion, are shown with dashed lines. Since the graphic depiction is understandable for those skilled in the art in light of the detailed description of the inventive method, a comprehensive explanation of the Figures can be omitted here, in order to avoid repetition. The reference symbols used and their meanings are listed in the reference symbol list.

In the following section, refinements of the inventive method are discussed, which relate to an additional increase in comfort for the driver of the motor vehicle. It can be provided that other equipment of the motor vehicle can be controlled using the separate control device provided for the activation of the N-holding phase. An especially advantageous refinement is, if by using this separate control device, a command to close a sun-roof actuated by an electric motor or a folding roof or folding top actuated by an electric motor or electrohydraulically and/or vehicle windows of the motor vehicle actuated by an electric motor, can also be emitted simultaneously with or close in time to the activation of the N-holding phase.

Other embodiments of the method of the invention are discussed in more detail in the following, which relate to the special configurations of the separate control device, which at least is provided to activate the N-holding phase with a friction-free neutral position in the transmission.

It can thus be provided that the separate control device to activate and de-activate the N-holding phase is configured as a switch that can be operated by the driver. Accordingly the N-holding phase, in which the transmission is in the friction-free neutral position, can be activated and/or de-activated by the driver's manual actuation of this switch. The design and spatial arrangement of such a switch in the interior of the motor vehicle can be arbitrary and are left up to the discretion of the person skilled in the art. An example of such an embodiment is an electromechanical switch, which is integrated in the ignition switch in such a way that the N-holding phase is activated if the ignition circuit is electrically interrupted by the ignition switch. Another example of an embodiment worth mentioning is an electromechanical switch which is constructed as part of the selector device or is integrated into the selector device.

It can also be provided that the separate control device to activate and de-activate the N-holding phase is constructed as a remote-controlled switch, which can be actuated from outside the vehicle. Accordingly, the N-holding phase, in which the transmission is in the friction-free neutral position, can be activated and/or de-activated by actuation of this remote-controlled switch from outside the motor vehicle. Possible systems are, in particular, systems with a transmitter located outside the motor vehicle (stationary or mobile), in order to be able to influence the maneuvering ability of the motor vehicle specifically from outside with a transmitter at the entrance to a car wash or a transmitter in a workshop.

It can also be provided that the separate control device to activate and de-activate the N-holding phase is constructed as a sensor, which evaluates signals in the surroundings of the vehicle. Accordingly, the N-holding phase, in which the transmission is in the friction-free neutral position, can be activated and/or de-activated by this sensor. Possible sensors are, for example, sensors for image detection, with which directional signs or the entrance to a car wash or a railroad crossing can be suitably detected in the sense of a pattern detection for predefined ambient conditions in which the gear, selected by the selector device, does not necessarily have the highest priority for which gear is actually set in the transmission.

If needed, the person skilled in the art can combine the three switch variations; "switch operated by driver", "remote-controlled switch" and "sensor", with each other in a meaningful manner.

In principle, the inventive method for selecting a parking device is suited for any arbitrary design. The parking device can be configured, both as a positively locking parking lock, as well as a non-positively locking parking brake. Usually, the parking device on the transmission is constructed as a parking lock, but can also be constructed as a parking brake. A parking device on the vehicle side to immobilize the vehicle is usually constructed as a parking brake.

Usually the parking lock of an automatic or automated transmission is integrated into the transmission itself. In addition in known transmissions, the mechanically, hydraulically, pneumatically, electrically, hydraulic-mechanically, pneumatic-mechanically, electromechanically, electrohydraulically or electropneumatically operating control system of the parking lock is integrated in the transmission or arranged externally on the transmission. In an electromechanically, electrohydraulically or electropneumatically operating control system of the parking lock, the actuator acting on the parking lock is usually selected by a transmission control device. It thus makes sense to integrate in the transmission control device all control functions, which are needed to convert the command in the transmission to activate and again de-activate the N-holding phase of the invention with a friction-free neutral position of the transmission so that the transmission control device initiates setting the neutral position in the transmission during activation of the N-holding phase as well as the actuation of the parking device in the transmission and/or vehicle during the de-activation of the N-holding phase of the invention.

In principle, however, a separate control device can also be provided, which then communicates with the transmission and the transmission control device in a suitable manner. In any event, suitable communication is needed between the separate control device and the transmission and the transmission control device. It can be provided that the setting of the neutral position of the transmission upon activation of the N-holding phase as well as the actuation of the parking device in the transmission and/or vehicle during de-activation of the N-holding phase are initiated by a control device of the motor vehicle's separate control device.

As already mentioned, the method of the invention is also suitable to selecting a parking brake of any arbitrary design. If the parking brake is provided on the vehicle, it is usually an integral part of the vehicle's service brake system and can be mechanically or electrohydraulically operated by the driver and also, in so far as available, by a brake control device. Known also, however, are self-sufficient systems, i.e., independent of the vehicle's service brake system. In the context of the invention, suitable communication between the separate control device and the other involved components, "parking brake and transmission or brake system and transmission control device", is required in any event in conjunction with the selection of a vehicle parking brake.

A motor vehicle of the invention comprises an automatic or automated transmission, a selector device to preset a gear (P, R, N, D) of the transmission operated by the driver of the motor vehicle, a parking device to immobilize the vehicle, a control device to select the parking device and gear positions in the transmission, depending on the gear (P, R, N, D) selected on the selector device, and depending on other motor vehicle operating parameters, as well as an additional, separate control device to specify the holding phase, in which the transmission is in a friction-free neutral position and is controlled by the previously described method of the invention. The parking device can be constructed as a transmission parking lock and/or a vehicle parking brake.

REFERENCE NUMERALS v_Fzg Vehicle speed
Pos Gear selected on the selector device
P "Parking" gear
N "Neutral" gear
R "Reverse" gear
D "Drive" gear
Auto_N Functional step "Set and leave the neutral position in the transmission"
Auto_P Functional step "Set parking lock and leave the parking lock in set condition"
N_hold Functional step "Leave the neutral position in the transmission"

N-holding phase Condition of "Transmission in friction-free neutral position"

The invention claimed is:

1. A method of selecting a neutral position of one of an automatic or an automated transmission of a motor vehicle and selecting a motor vehicle parking device provided for immobilizing the motor vehicle, the neutral position and the parking device being one of set or actuated depending on a gear (P, R, N, D) selected with a selector device by a driver of the motor vehicle and other operating parameters of the motor vehicle, the method comprising the following steps:

immobilizing and retaining the vehicle immobilized by actuating the parking device IF simultaneously the motor vehicle is at least approximately stationary AND an ignition circuit, which operates a drive motor of the motor vehicle, is electrically interrupted AND a "Park" (P) gear is selected with the selector device;

automatically immobilizing the vehicle by actuating the parking device IF simultaneously the motor vehicle is at least approximately stationary AND the ignition circuit, which operates the drive motor of the motor vehicle, is electrically interrupted AND one of a "Drive" (D) gear or a "Reverse" (R) gear is selected with the selector device;

automatically shifting and temporarily retaining the transmission in the neutral position, free of frictional connection, IF simultaneously the motor vehicle is at least approximately stationary AND the ignition circuit, which operates the drive motor of the motor vehicle, is electrically interrupted AND a "Neutral" (N) gear is selected with the selector device AND an Neutral-holding phase is simultaneously activated by a separate control device, provided in addition to the selector device, as long as an energy management system of the motor vehicle allows activation of the Neutral-holding phase; and automatically retaining the transmission in the neutral position free of any frictional connection, until it is detected that the driver one of wants to leave or is leaving the vehicle, upon which the parking device is automatically actuated to immobilize the motor vehicle IF simultaneously the motor vehicle is at least approximately stationary AND the ignition circuit, which operates the drive motor of the motor vehicle, is electrically interrupted AND the "Neutral" (N) gear is selected with the selector device AND the Neutral-holding phase is not activated.

2. The method according to claim 1, further comprising the step of enabling the energy management system to maintain activation of the Neutral-holding phase when at least one of a current charge state and a current electrical voltage of a motor vehicle energy accumulator, which supplies electrical energy to at least one of a control device of the transmission and to start the drive motor, is greater than a predefined a lower boundary value.

3. The method according to claim 1, further comprising the step of enabling the energy management system to maintain activation of the Neutral-holding phase when a calculated difference between a current electrical charge state of a energy accumulator, which supplies electrical energy to at least one of a control device of the transmission and to start the drive motor, and a quantity of electrical energy needed to hold the transmission for a predefined time span in the neutral position, free of a friction connection, is greater than a predefined lower boundary value.

4. The method according to claim 3, further comprising the step of the determining the quantity of electrical energy needed for holding the transmission for the predefined time span in the neutral position by one of mathematical integration of a theoretical power consumption of the control device over a predefined time span, or mathematical integration of a product from an actual operating voltage and the theoretical power consumption of the control device over the predefined time span.

5. The method according to claim 2, further comprising the step of predefining the lower boundary value as a function of one of a temperature of the drive motor or a temperature of vehicle surroundings.

6. The method according to claim 1, further comprising the step of maintaining the Neutral-holding phase only when the motor vehicle is in an at least approximately horizontal position.

7. The method according to claim 1, further comprising the step of maintaining the Neutral-holding phase only when an ignition key is one of retained in one of a mechanical or an electromechanical ignition switch associated with the ignition key or is located within a defined zone around an electronic ignition switch of the motor vehicle associated with the ignition key.

8. The method according to claim 1, further comprising the step of maintaining the Neutral-holding phase only when the method detects that the driver one of does not want to leave the vehicle or is not leaving the vehicle.

9. The method according to claim 1, further comprising the step of maintaining the Neutral-holding phase only when a parking lock provided in the transmission to immobilize the motor vehicle has not been set.

10. The method according to claim 1, further comprising the step of enabling the driver to manually deactivate the previously activated Neutral-holding phase using the separate control device.

11. The motor vehicle according to claim 1, further comprising the step of automatically deactivating the previously activated Neutral-holding phase.

12. The method according to claim 11, further comprising the step of automatically deactivating the previously activated Neutral-holding phase if at least one of:

one of the ignition key is removed from one of a mechanical or an electro-mechanical ignition switch or is withdrawn from a defined zone around an electronic ignition switch;

a current speed of the motor vehicle is greater than a predefined velocity threshold;

the motor vehicle is not at least approximately horizontal;

the driver one of wants to leave or is leaving the vehicle; and a predefined span of time has elapsed.

13. The method according to claim 11, further comprising the step of automatically deactivating the previously activated Neutral-holding phase with the energy management system of the motor vehicle.

14. The method according to claim 13, further comprising the step of automatically deactivating the previously activated Neutral-holding phase if at least one of a current charge state and a current electrical voltage of a motor vehicle energy accumulator, which supplies electrical energy to at least one of a control device of the transmission and to start the drive motor, is lower than a predefined discharge threshold.

15. The method according to claim 13, further comprising the step of automatically deactivating the previously activated Neutral-holding phase if a quantity of energy, which in a context of the method is removed from an energy accumulator of the vehicle provided to at least one of supply a transmission control device and start the drive motor, is one of equal to or greater than a predefined threshold value.

16. The method according to claim 15, further comprising the step of determining the quantity of electrical energy by one of mathematical integration of actual power consumption of the control device over time span or mathematical integration of a product from an actual operating voltage and the actual power consumption of the control device over time.

17. The method according to claim 11, further comprising the step of automatically actuating the parking device for immobilizing the vehicle if the previously activated Neutral-holding phase is one of manually or automatically deactivated.

18. The method according to claim 1, further comprising the step of maintaining the Neutral-holding phase with other equipment of the motor vehicle that are selected by a separate control device.

19. The method according to claim 18, further comprising the step of maintaining the Neutral-holding phase substantially simultaneously with a command from the separate control device for actuating an electric motor to at least one of close a sun roof, manipulate a motor vehicle window or one of electrically or electrohydraulically actuate a folding roof or a folding top.

20. The method according to claim 1, further comprising the step of enabling the driver to manually activate a switch for at least one of activating and de-activating the Neutral-holding phase.

21. The method according to claim 1, further comprising the step of remotely activating a remote controlled switch from outside the motor vehicle to at least one of activate or de-activate the Neutral-holding phase.

22. The method according to claim 1, further comprising the step of the at least one of activating and de-activating the Neutral-holding phase in response to a sensor, which evaluates signals of the motor vehicle's surroundings.

23. The method according to claim 1, further comprising the step of activating, if the driver wants to leave or is leaving the vehicle while the Neutral-holding phase is activated, one of an acoustic or an optical indication.

24. A motor vehicle having one of an automatic or automated transmission, comprising:
a selector device which is operated by a driver of the motor vehicle for selecting a gear (P, R, N, D) of the transmission;
a parking device provided for immobilizing the vehicle;
a control device for select the parking device and a transmission gear position depending on the gear (P, R, N, D) selected with the selector device by the driver and depending on other motor vehicle operating parameters; and
an additional, separate control device to specify a Neutral-holding phase, in which the transmission is in a friction-free neutral position, controlled by a method comprising the steps of:
immobilizing and retaining the vehicle immobilized by actuating the parking device IF simultaneously the motor vehicle is at least approximately stationary AND an ignition circuit, which operates a drive motor of the motor vehicle, is electrically interrupted AND a "Park" (P) gear is selected with the selector device;
automatically immobilizing the vehicle by actuating the parking device IF simultaneously the motor vehicle is at least approximately stationary AND the ignition circuit, which operates the drive motor of the motor vehicle, is electrically interrupted AND one of a "Drive" (D) gear or a "Reverse" (R) gear is selected with the selector device;
automatically shifting and temporarily retaining the transmission in the neutral position, free of frictional connection, IF simultaneously the motor vehicle is at least approximately stationary AND the ignition circuit, which operates the drive motor of the motor vehicle, is electrically interrupted AND a "Neutral" (N) gear is selected with the selector device AND an Neutral-holding phase is simultaneously activated by a separate control device, provided in addition to the selector device, as long as an energy management system of the motor vehicle allows activation of the Neutral-holding phase; and
automatically retaining the transmission in the neutral position free of any frictional connection, until it is detected that the driver one of wants to leave or is leaving the vehicle, upon which the parking device is automatically actuated to immobilize the motor vehicle IF simultaneously the motor vehicle is at least approximately stationary AND the ignition circuit, which operates the drive motor of the motor vehicle, is electrically interrupted AND the "Neutral" (N) gear is selected with the selector device AND the Neutral-holding phase is not activated.

* * * * *